Müller

[54] LIQUID COOLED NUCLEAR REACTOR

[75] Inventor: Richard Arno Müller, Neuthard, Germany

[73] Assignee: Gesellschaft fur Kernforschung m.b.H, Karlsruhe, Germany

[22] Filed: Mar. 22, 1971

[21] Appl. No.: 126,855

[30] Foreign Application Priority Data
    Mar. 21, 1970  Germany............................ 2013586

[52] U.S. Cl....................... 176/65, 176/62, 176/63, 176/87
[51] Int. Cl....................... G21c 13/02, G21c 15/24
[58] Field of Search .................... 176/62, 63, 65, 87

[56]  References Cited
        UNITED STATES PATENTS

| | | | |
|---|---|---|---|
| 3,151,034 | 9/1964 | Douglass, Jr. et al. | 176/65 X |
| 3,242,981 | 3/1966 | Hutchinson et al. | 176/65 X |
| 3,182,002 | 5/1965 | Laithwaite et al. | 176/65 |
| 3,312,596 | 4/1967 | Grain | 176/65 X |
| 3,448,797 | 6/1969 | Chevallier et al. | 176/65 X |
| 3,425,907 | 2/1969 | Bonsel et al. | 176/65 |
| 3,410,752 | 11/1968 | Dell | 176/65 X |
| 3,395,076 | 7/1968 | Ruppen, Jr. | 176/65 |

*Primary Examiner*—Benjamin R. Padgett
*Assistant Examiner*—Roger S. Gaither
*Attorney, Agent, or Firm*—Spencer & Kaye

[57]  ABSTRACT

There is disclosed a nuclear reactor that has a reactor tank enclosing a reactor core and a component tank accommodating a coolant pump and a heat exchanger disposed in a shell which is secured gastight to the top wall of the component tank. The coolant is carried by conduits in both directions between the heat exchanger and the reactor core. The space above the coolant level in the component tank externally of the shell communicates by means of a further conduit with the space above the coolant level in the reactor tank. The space above the coolant level in the reactor tank communicates with the space above the coolant level in the shell by means of a pressure equalizing conduit.

10 Claims, 2 Drawing Figures

LIQUID COOLED NUCLEAR REACTOR

The invention relates to a liquid cooled nuclear reactor consisting of a stationary reactor tank containing the core and a stationary component tank containing the heat exchangers and the coolant circulation pump, the component tank being connected with the reactor tank by a coaxial tube in which the coolant flows from the core to the heat exchangers and back.

There are two different systems of liquid cooled, especially liquid sodium cooled nuclear reactors:

the pool type combining all important reactor components in one single reactor tank and the loop type in which all the major and important reactor components are installed in a tank separate from the reactor and are connected with the reactor by means of a tube system.

Below, the advantages and disadvantages of both systems will be investigated.

1. Loss of Coolant

In the pool concept, the pressurized section of the primary circuit is arranged completely within the low pressure coolant; hence, the outer tank wall must withstand only the low pressures of the coolant and the cover gas. For this reason, minor leaks in the pressurized section can be tolerated and for the same reason a loss of coolant in the system due to pumps continuing to run is impossible. Besides, leakages from the pool can be prevented by arranging a tightly fitting containment around the tank in such a way as to prevent the coolant level in the tank from decreasing to a dangerous level. In addition, the probability of leaks is very low in these low pressure vessels which are free from any attachments and tube penetrations.

By contrast, the loop concept offers comparable positive characteristics only if a double wall is provided for, at least in the pressurized section. However, this concept is not applied because it results in major difficulties in design and construction. Hence, if there is a leak in the pressurized section of the circuit, the pumps must immediately stop or the quick-acting valves must be actuated at once together with a reactor scram to prevent excessive loss of coolant.

2. Decayheat Removal

In this respect, both systems are almost equivalent, provided that excessive loss of coolant can be prevented. However, the change from full power operation to emergency cooling, especially in the case of a major leakage, is easier than in the pool type plant because the main pumps remain in operation and the large sodium capacity reduces the effect of thermal shocks. In addition, a smaller capacity of the emergency cooling system is sufficient because excess heat can be retained in the sodium pool for some time in the initial period following a reactor scram.

3. Limitations Imposed on Adjacent Components by the Concept

In the loop concept, the installations above the reactor, especially the refueling systems, are practically unimpaired because the primary circuit components are set up a sufficient distance away from the reactor core. By contrast, these parts are influenced in the pool system, especially, if a hot cell is required for refueling.

4. Technical Risk

In this respect, the loop type system is undoubtedly superior to the pool type system because it entails much less new problems than the latter does. The problems discussed specifically in connection with the pool type concept are these: Reactor tank to be fabricated on site; sealing of shielded tanks of large diameters; thermal insulation; neutron shield positioned in sodium; movable seals; instrumentation, etc. In addition, the loop type concept allows easier assembly work because prefabricated internals can be installed under relatively clean conditions.

5. Maintenance Characteristics

With respect to maintenance characteristics, the loop system is again superior to the pool system because all the components are more easily accessible. In addition, the coolant activity during operation can decay in a separate loop at a reduced power level and, moreover, it is possible to shut down single loops whenever repair work must be done. This is impossible in pool system. Moreover, the pool type reactor contains a number of individual components, e.g., movable seals, which are badly accessible.

As is evident from these comparisons, there are a number of reasons in favor of the loop type concept. However, pool type reactors offer decisive advantages with respect to the problem of leak tightness because they require no quick acting safety installations. Therefore, these advantages should be retained in other designs wherever possible.

Only one nuclear reactor is known (USAEC report ANL-7520, part II) in which the intermediate heat echangers and the coolant pumps are combined in one unit. However, in that design, the outer tank wall is subjected to the full coolant pressure. Now, the invention has the purpose of solving the problem of designing a nuclear reactor on the basis of this state of the art, which, as much as possible, combines the advantages of pool type reactors (e.g., leak tightness and insensitivity to losses of coolant) with those of loop type reactors (e.g., good maintenance characteristics, and low technical risk) and yet allows a very compact, economical design that can be implemented with simple construction expenditure. Moreover, the reactor is to satisfy the most stringent criteria applied to its components and its operation with respect to safety in cases of disturbance.

In the invention, this problem is solved by subdividing the amount of coolant between the reactor and the component tanks in such a way, at least during reactor operation, that the component tank is filled with coolant only in the bottom part and the coolant level in this tank outside the heat exchangers is kept below the coolant level of the reactor tank. In its upper region, the inner space of the component tank is subdivided into two separate spaces by means of a gastight shell closing the heat exchanger and extending up to the top; the space above the coolant level outside the heat exchanger area is connected with the space above the coolant level in the reactor tank by a tube equipped with a pressurizing system. Moreover, the space above the coolant level in the area of the heat exchanger is connected with the space above the coolant level in the reactor tank by means of a pressure equalization line and with the housing of the coolant pump above and below the coolant level by equalization tubes. In a special embodiment of the invention, the coaxial tube connecting the tanks opens into the component tank above the coolant level; at the point of discharge a corrugated tube compensator is installed between the outer tube of the coaxial line and the outer wall of the component tank. The outer tube of the coaxial line in the component tank runs upward above the coolant level into a transverse duct which, in turn, opens into the shell of the intermediate heat exchanger in a gas tight connection at the height of the coolant level.

Further details of the invention are explained below on the basis of FIGS. 1 and 2.

Figure 1:
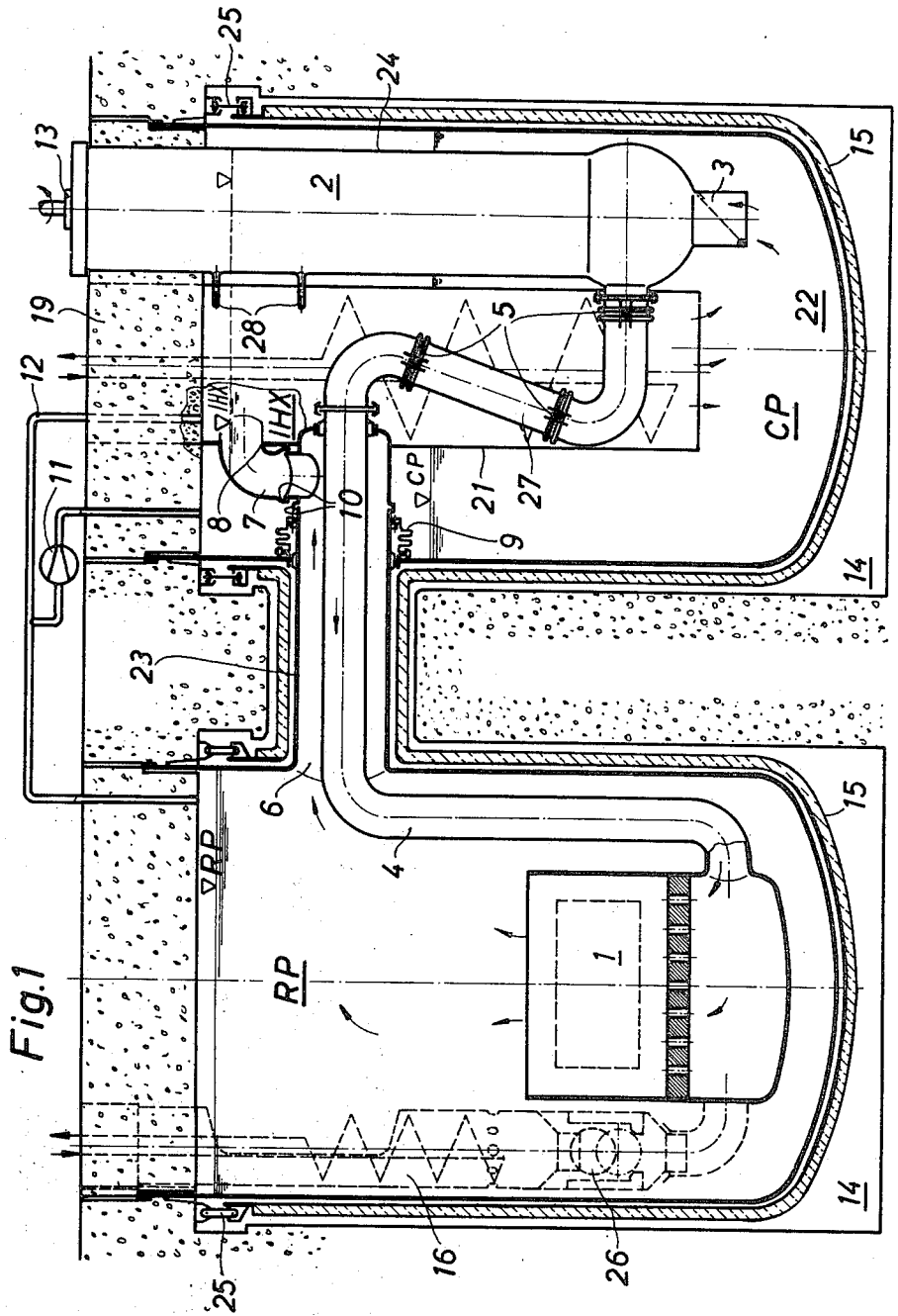
FIG. 1 is a cross section of a reactor with the component tank attached to it.

The basis principle of the invention is shown in FIG. 1. The reactor core 1 is arranged in the bottom part of the reactor tank RP. A coaxial tube 4,6 connects one or several stationary component tanks CP with the reactor tank RP. Each component tank CP accomodates the components of the primary cooling system, especially the intermediate heat exchangers IHX and the coolant circuit pumps. The intermediate heat exchanger IHX and the coolant circuit pumps 2 are stationary components attached to the upper shielding top 19 of the component tank. The outer shell 21 of the intermediate heat exchanger IHX is connected gastight with the top 19. The coolant pump 2 carries a check valve 3 on the suction side. The pump takes the coolant in from the component tank CP and forces it through an intermediate tube 27 into the inner tube 4 of the coaxial line to the reactor core 1. For thermal equalization, the tube 27 is provided with articulated compensators 5. Tube 4 forms the central channel of the coaxial line of connection. It is equipped with a thermal insulation not shown in greater detail. The coolant heated in the reactor tank RP flows back under gravity into the component tank CP via the annular channel 6 of the coaxial line. Passing the transverse channel 7 and the overflow edge 8 it enters into the outer shell 21 of the intermediate heat exchanger IHX. The special designs of the transverse channel 7 and the overflow edge 8 serve the purposes of steadying the influx of the coolant into the heat exchanger IHX and preventing gas bubbles from the cover gas to be carried over. Then the coolant flows through the intermediate heat exchanger IHX in a downward flow and collects in the bottom part 22 of the component tank CP.

The thermal expansions occurring in the pressure tube 6,4 between the pump 2 and the inlet plenum of the reactor core 1 are balanced by the articulated compensators 5 mentioned above. The outer shell 23 of the coaxial line is routed merely in the wall of the component tank CP. The required seal is achieved through axial corrugated tube compensators 9. These corrugated tube compensators are installed so as to be easily removable and to prevent a potential leakage from causing a major loss of sodium.

This design allows an unrestricted thermal expansion of the component tanks CP and the connecting lines 6,4. In order to be able to accomodate also thermal expansions within the component tank, sliding sleeves 10 are installed at several points of the low pressure system, e.g., at the point of entry of the pressure line 4 into the coaxial duct 6, in the outer wall of this coaxial duct 6 and in the transverse duct 7 leading to the intermediate heat exchanger IHX. However, complete sealing is not necessary at these points.

As is shown in FIG. 1, the axial corrugated tube compensators 9 at the point of penetration of the coaxial line 6 through the wall of the component tank CP are located within the inert gas space, whereas the liquid coolant is maintained at a lower level. As a consequence, thermal stresses are largely avoided in these corrugated tube compensators 9 and their attachment parts.

The coolant level within the shell 21 of the intermediate heat exchanger IHX, $\nabla$ IHX, is nearly corresponding to that of the reactor tank, $\nabla$ RP. Only the slight pressure drop $\Delta h_1$ between the reactor tank RP and the intermediate heat exchanger IHX causes a small difference. These characteristics of the coolant level are in line with the slightly higher cover gas pressure $\Delta h_3$ in the component pool CP. For this reason, the cover gas system contains a pressure step-up system 11 besides equalization tubes 12 connecting the component tank CP with the shell of the intermediate heat exchanger IHX. However, the higher cover gas pressure in the component tank CP can be maintained also by means of special pressure control systems which may be parts of the cover gas storage or the purification systems.

These coolant level pressure conditions are determined by the following equations:

$\nabla$ RP $-\nabla$ IHX $= \Delta h_1$
$\nabla$ IHX $-\nabla$ CP $= \Delta h_2 + \Delta h_3$
$\nabla$ RP $-\nabla$ CP $= \Delta h_1 + \Delta h_2 + \Delta h_3$ where $\Delta h_2$ is the pressure drop in the intermediate heat exchanger IHX.

This system is self-regulating. If the coolant flow rate is increased by the pump 2, $\nabla$ CP will decrease and $\nabla$ RP will increase. As a consequence, in case $\Delta h_3$ remains constant, the coolant flow rate from the reactor tank RP to the component tank CP is increased until the rise in pressure $\Delta h_1 + \Delta h_2$ corresponds to the conditions mentioned above. In case of a failure of the pump 2, $\nabla$ CP and $\nabla$ RP will increase and $\nabla$ IHX will decrease until the difference in levels is equal to $\Delta h_3$. At the same time, the flow rate and $\Delta h_1 + \Delta h_2$ will drop to zero. However, in order to limit the coolant level fluctuations to an acceptable value in case of $\Delta h_3$ remaining constant, a comparatively small value is selected for $\Delta h_3$ and $\Delta h_2$.

The intermediate heat exchanger shell 21 and the pump housing 24 are connected by the coolant and the overflow tube 28. Therefore, the coolant level of the pump 2 corresponds to the level in the intermediate heat exchanger IHX. Moreover, the packing seal 13 of the pump shaft can operate under low pressure conditions.

The reactor tank RP and the component tank CP are arranged in individually shielded vaults 14. A containment 15 closely surrounding the vaults encloses the tank CP and the coaxial lines 6. The containment is thermally insulated and is cooled by inert gas on the outer surface. The containment 15 is supported by special suspension systems 25 in such a way that a differential thermal expansion is balanced while the horizontal tube section acts as a tensible and compression bar.

Figure 2:
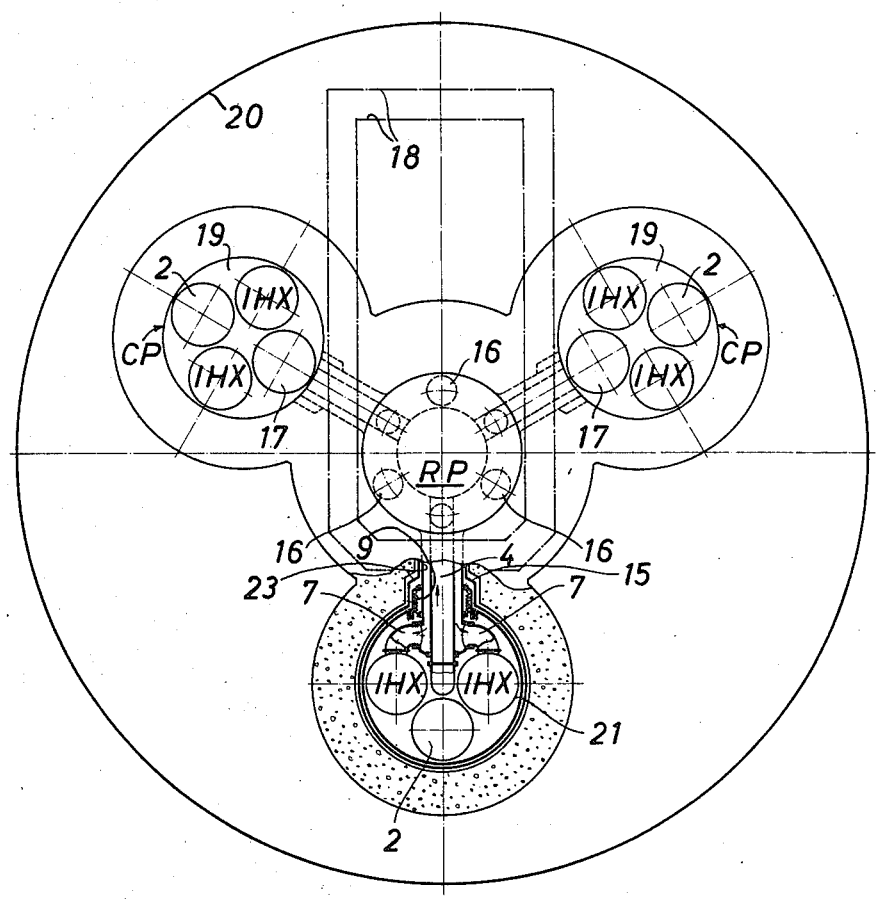
FIG. 2 is a top view of a nuclear reactor plant in which three component tanks are attached to one reactor tank.

FIG. 2 shows a major reactor facility in which three component tanks are attached to one reactor tank. Each component tank CP contains two intermediate heat exchangers IHX and a coolant pump 2. One component tank, which is shown in an open representation, shows details of the installation of the axial corrugated tube compensators and the arrangement of the coolant lines, especially of the two transverse ducts 7. Besides the penetrations for the two intermediate heat exchangers IHX and the pump 2 in the shielded top, the component tank CP contains a flap 17 which is closed by a shielded insert and allows easy access to the inner components. A hot cell 18 for refueling and all maintenance operations in the reactor tank can easily be installed in the interspaces between the tops of the component tanks.

Failure of one coolant pump causes a change in the coolant level and is accompanied by a decrease of the flow rate in the disturbed primary sub-cooling system, as described above. The check valve in the pump inlet is closed by the coolant pressure generated by the running pumps of the other sub-cooling systems. Hence, it is possible to continue operation of the plant at a reduced power level.

In the case of rupture of a secondary circuit, the coolant temperature in the component tank containing the failed cooling system will rise. However, the resultant thermal shock will be relatively small as a consequence of the rather large coolant volume.

In the case of a loss of cover gas pressure $\Delta h_3$, $\nabla CP$ will rise and $\nabla RP$ will fall until the differential pressure is equal to $\Delta h_1 + \Delta h_2$. Under these conditions the axial corrugated tube compensators will contact liquid sodium.

Minor leaks in the pressure tubes can be tolerated. In the case of major leaks, e.g., the rupture of a whole tube, the reactor must be scrammed.

If there is a leak in the outer wall of the tank within the coolant area, the coolant will fill the annular gap between the wall of the container and the containment up to a level which is determined by the differential pressure between the cover gas in the reactor tank and the cover gas in the shielding vault. The resultant decrease in the coolant level can be tolerated.

In the case of a leak in the cover gas area of the component tank the quantity of gas leaking out can be limited by the following operations in the disturbed component tank.

The pump is turned off.

The cover gas pressure in the intermediate heat exchanger is increased to such a level that the coolant level in the transverse duct between the outer space of the coaxial tubes and the shell of the intermediate heat exchanger decreases below the overflow edge 8.

The pressure in the cover gas space of the component tank is reduced and balanced by an increase in cover gas pressure in the shielded vault.

In each of the disturbances outlined above the removal of the decay heat in the remaining sub-systems at a low pumping speed is guaranteed. However, it is possible also to install separate auxiliary cooling systems 16 in the reactor tank RC, as shown in dashed lines in FIG. 1. Such an auxiliary system 16 can operate with natural convection on the primary and secondary sides and will safeguard the necessary amount of cooling also if there is a complete failure of the pumps in all the circuits. During normal operation, a check valve 26 in the primary side of the auxiliary cooling circuit is kept closed by the pumping pressure.

The special advantages of the invention lie in the fact that a cooling circuit filled with coolant is maintained also if the circulation pump is turned off because natural convection of the coolant is possible. Moreover, the coolant level in the intermediate heat exchanger is disturbed to an insignificant amount only, so that there is no danger of inert gas being carried over in the heat exchanger. The feeding pressure of the circulation pump is increased, i.e., the suction conditions are improved so that a more compact pump with a higher speed can be utilized.

Moreover, it is possible to operate the packing seat of the pump shaft penetration under low pressure.

These advantages and others characterize the invention as an optimal design for liquid metal cooled reactors. Especially the leak tightness, which is comparable to a pool type reactor, and the compact design, the diminution of the consequences of a thermal shock, the possibility of closing down individual primary sub-cooling systems, the good maintenance and repair characteristics of components in the primary cooling system, the simple preheater system and, finally, the free space available for refueling above the reactor prove to be highly advantageous.

I claim:

1. A liquid cooled nuclear reactor comprising in combination:
   a. a stationary reactor tank;
   b. a reactor core disposed in said reactor tank;
   c. a stationary component tank situated externally of said reactor tank and having an inner space including an upper zone and an upper boundary;
   d. a shell disposed in said component tank and connected gastight to said upper boundary, said shell subdividing the inner space of said component tank into two regions;
   e. a heat exchanger disposed in said shell;
   f. first conduit means interconnecting said tanks for carrying coolant from said reactor core to said heat exchanger;
   g. second conduit means interconnecting said tanks for carrying coolant from said heat exchanger to said reactor core;
   h. a coolant circulation pump disposed in said component tank for maintaining a coolant flow between said tanks, whereby at least during reactor operation, the coolant level in said component tank externally of said shell being maintained below the coolant level in said reactor tank,
   i. third conduit means maintaining communication between the space above the coolant level in said reactor tank and the space above the coolant level externally of said shell in said component tank,
   j. a pressurization system communicating with said third conduit means; and
   k. a pressure equalizing fourth conduit means maintaining communication between the space above the coolant level in said reactor tank and the space above the coolant level of said heat exchanger in said shell.

2. Nuclear reactor as claimed in claim 1 in which said coolant pump has a housing; the space within said shell is connected with the inner space of said housing above and below the coolant level in said shell by means of equalization tubes.

3. Nuclear reactor as claimed in claim 1 in which said first and second conduit means constitute a coaxial tube line having an outer tube and an inner tube, said outer tube merging into the component tank above the coolant level therein, said combination further comprising a corrugated tube compensator installed between the outer tube of the coaxial line and a bounding wall of the component tank.

4. Nuclear reactor as claimed in claim 3 in which the outer tube of the coaxial line in the component tank above the coolant level leads vertically upward into a transverse duct merging gastight into the inner space of said shell at the height of the coolant level therein.

5. Nuclear reactor as claimed in claim 3 in which the circulation pump draws coolant from a bottom zone of the component tank, said combination further comprising an intermediate tube connecting said pump with the inner tube of the coaxial line, said intermediate tube extending upward and is subdivided into several intermediate pieces within the component tank, said intermediate pieces are interconnected by articulated compensators.

6. Nuclear reactor as claimed in claim 3, wherein said outer tube extends from said reactor tank below the coolant level therein.

7. Nuclear reactor as claimed in claim 1 in which an additional emergency cooling system is installed in the reactor tank.

8. Nuclear reactor as claimed in claim 1 in which several component tanks are connected with one reactor tank.

9. Nuclear reactor as claimed in claim 1 in which several heat exchangers and coolant pumps are arranged in each component tank.

10. Nuclear reactor as claimed in claim 1, said combination further comprising a hot cell for refueling arranged above the reactor tank between the tops of the component tanks.

* * * * *